United States Patent [19]

Larson et al.

[11] Patent Number: 5,363,297
[45] Date of Patent: Nov. 8, 1994

[54] AUTOMATED CAMERA-BASED TRACKING SYSTEM FOR SPORTS CONTESTS

[76] Inventors: Noble G. Larson, 15 Lewis Ave., Arlington, Mass. 02174; Kent A. Stevens, 3414 Centennial Blvd., #160, Eugene, Oreg. 97401

[21] Appl. No.: 894,101

[22] Filed: Jun. 5, 1992

[51] Int. Cl.$^5$ ............................................. G06F 15/44
[52] U.S. Cl. .................................... 364/410; 342/126
[58] Field of Search ................ 364/410; 367/127, 118; 273/29 R, 77 R, 32 R; 342/126, 59, 127, 129; 340/323

[56] References Cited

U.S. PATENT DOCUMENTS

| | | | |
|---|---|---|---|
| 4,980,871 | 12/1990 | Sieber et al. | 367/127 |
| 5,067,717 | 11/1991 | Harlan et al. | 273/183 |
| 5,082,263 | 1/1992 | Berger | 273/29 |
| 5,138,322 | 8/1992 | Nuttall | 342/126 |
| 5,150,895 | 9/1992 | Berger | 273/29 R |
| 5,153,826 | 10/1992 | Johnson | 304/410 |
| 5,231,483 | 7/1993 | Sieber et al. | 358/125 |
| 5,239,463 | 8/1993 | Blair et al. | 364/410 |

Primary Examiner—Gail O. Hayes

[57] ABSTRACT

A system for the accumulation of detailed moment-to-moment information concerning the movements of players and of the ball in a sporting contest. One or more cameras (11, 12, 14) are situated so as to cover the entire playing area (10) of the event. The output of at least one of these cameras is provided to a digital image processor (22), which tracks the movements of the images, or silhouettes, of players in the camera images. By employing multiple camera views of the same playing area, the tracking processor can, in most cases, resolve ambiguities arising from overlaps in any one view. For the remaining, unresolved, cases, one or more human operators, provided with the same or similar camera views, are employed, through an interactive interface. The operators are provided with apparatus (30) for identifying players, through a query/response method, as requested by the tracking processor (22). The operators also provide initial player identification at the start of the event, and following breaks in the action, using the same apparatus. A varient system is described wherein the player identification task of the operator is performed, instead, by electronic tracking devices, such as radio transmitters, in conjunction with off-field electronics (60, 61, 67, 68), incorporating telemetry and triangulation in order to obtain identity and approximate position of all game participants.

14 Claims, 4 Drawing Sheets

AUTOMATED CAMERA-BASED TRACKING SYSTEM FOR SPORTS CONTESTS

BACKGROUND OF THE INVENTION

This invention relates to the creation of a detailed and comprehensive database on the moment-to-moment movements of the players and ball in sports contests, and to the subsequent analysis of this database for the extraction of a variety of statistics, measurements, and other information concerning the event.

For many years it has been the practice in professional sports, such as basketball and soccer, to manually accumulate statistical data on the performance of the players and teams. Much of this data concerns discrete talleys of player performance such as shooting accuracy or incidence of fouls. There has been, up until now, no systematic quantitative information maintained on the complete movements of the players and the ball during a game, that is to say, the continuous dynamics of the event. The accumulation of detailed positional data throughout the course of the game would be an infeasible manual task.

Creating such a database, by automated methods, however, would provide a great wealth of information, previously unobtainable, on many aspects of a sport. In basketball, for example, a sport where the judicious expenditure of an athlete's energy is crucial, consistent measurement of the amount of court covered and total distance run by a particular player would be extremely useful in optimizing an individual's performance. Statistics on the spread of ball rebound angles, as a function of the shooting angle, is another example. On a more sophisticated level, having a comprehensive game database would make possible a systematic characterization of the inter-player dynamics of "fast breaks" and other complex situations.

A number of sports have been considered in the development of this invention. Aside from basketball and soccer, other sports that would benefit from this technology include volleyball, tennis, and hockey. In all of these sports player positioning is extremely critical, making a data base such as that made possible by this invention of considerable value.

The invention described herein is a computer-based system for the accumulation of the sort of information described above. The key component of the invention is a digital computer tracking processor which maintains continuous information on the position of each player and the ball almost all of the time, by applying image processing techniques to information provided by one or more video cameras. The system, in its principal form, is interactive, involving the assistance of one or more human operators. Situations will inevitably occur in which the tracking processor is unable to resolve an ambiguity (for example a player substitution) and will ask an operator to intervene. Suitable camera placement, as well as efficient image processing, keeps the frequency of this interaction within managable limits.

By combining a powerful, though imperfect, tracking processor, with a knowledgeable operator, the desired result can be obtained, and with reasonable expense and effort. This invention will greatly facilitate the application of the ever expanding array of computer resources to the field of sports analysis.

SUMMARY OF THE INVENTION

A system is provided that allows the accumulation of detailed moment-by moment information concerning the movements of the players and the ball using, as its source, images of the playing area provided by strategically placed imaging devices (e.g. visual bandwidth or infrared cameras). In the case of an indoor sport, such as basketball, some of the cameras may be placed overhead, providing views of the game action with relatively few instances of player images overlapping one another. Outdoor sports, such as soccer, will in general require the use of cameras positioned on the perimeter of the playing area, resulting in a relatively high incidence of player image overlap, at least as viewed from any one camera. The geometry of the situation, even in these cases, causes simultaneous overlaps of player images within multiple views, to be rare ("pileups" in soccer or football are obvious cases where overlap could occur from all camera perspectives).

The video information from the cameras is provided as input to a realtime image processing system (the "tracking processor" or "tracker"), either directly, i.e. live, or through some indirect image storage medium such as video tape or other magnetic medium. A long distance connection, such as a satellite link, may, in some cases, be convenient. The tracking processor localizes the players in each frame on the basis of computing the centroid of each player's image silhouette. The silhouette is isolated by distinguishing those pixels which likely correspond to the player from those that likely belong to the background, using conventional image processing techniques. The techniques involved are not claimed as novel. Techniques known in the art for background normalization, boundary extraction, and centroid computations suffice for purposes of this invention (see description of these techniques in, e.g. Haralick, R. M. and Shapiro, L. G., Computer and Robot Vision Vol. 1, Reading, Mass.: Addison-Wesley, 1992). The image processing techniques need not be highly sophisticated, since, as discussed above, human interaction will be both necessary and desirable for resolving the identities and positions of players at those moments their silhouettes merge. A sufficient degree of automation is afforded, therefore, by a system which tracks players only during the time when they present isolated silhouettes (i.e. where the players project as spatially separated in the image frames), Thus the invention benefits from sophisticated image processing, but, in the extreme, could be based on manual tracking of the players' images exclusively (using interactive pointing devices to follow the position of each player). The invention is made efficient and practical by having much of the tracking performed automatically.

For situations where the tracking processor encounters ambiguities due to simultaneous overlaps, or other circumstances, an interactive interface is provided. A human operator provides the additional identification information needed for the tracking system. Interaction is central to this system, at least in its principal embodiments. The operator is required to supervise the progress of the tracker, editing the tracking data as necessary, and responding to disambiguation queries originated by the tracker. The tracker may operate either in realtime, relative to the game, or after the event, using input from an image storage medium such as video tape.

An object of this invention is an edited game record, i.e. comprehensive data about the position of each player, and the ball, during the course of the game.

An ensuing advantage over prior art is the subsequent availability, in digital form, of the positional data for computer analysis and visualization, the latter involving, for example, a 4-d graphics processor. In one situation, a critical play might be reconstructed and viewed from any requested perspective. In another, the spatial distribution of specific players may be displayed, either relative to the playing field or relative to other players. Of course a wealth of statistics could be computed from this game record, such as peak running speed, average running speed as a function of period in the game, distance travelled, and time in possession of the ball.

DESCRIPTION OF PREFERRED EMBODIMENTS

Three embodiments are described below. The first deals with a typical indoor sport, played-in an area amenable to overhead camera angles. The second embodiment deals with a sport played outdoors, where elevated oblique, but not necessarily directly overhead, perspectives are available. The third embodiment has much in common with the first two, but implements an important component of the system quite differently than the others. Finally, some extensions and modifications, applicable to one or more of the embodiments, are enumerated.

Figure 1:
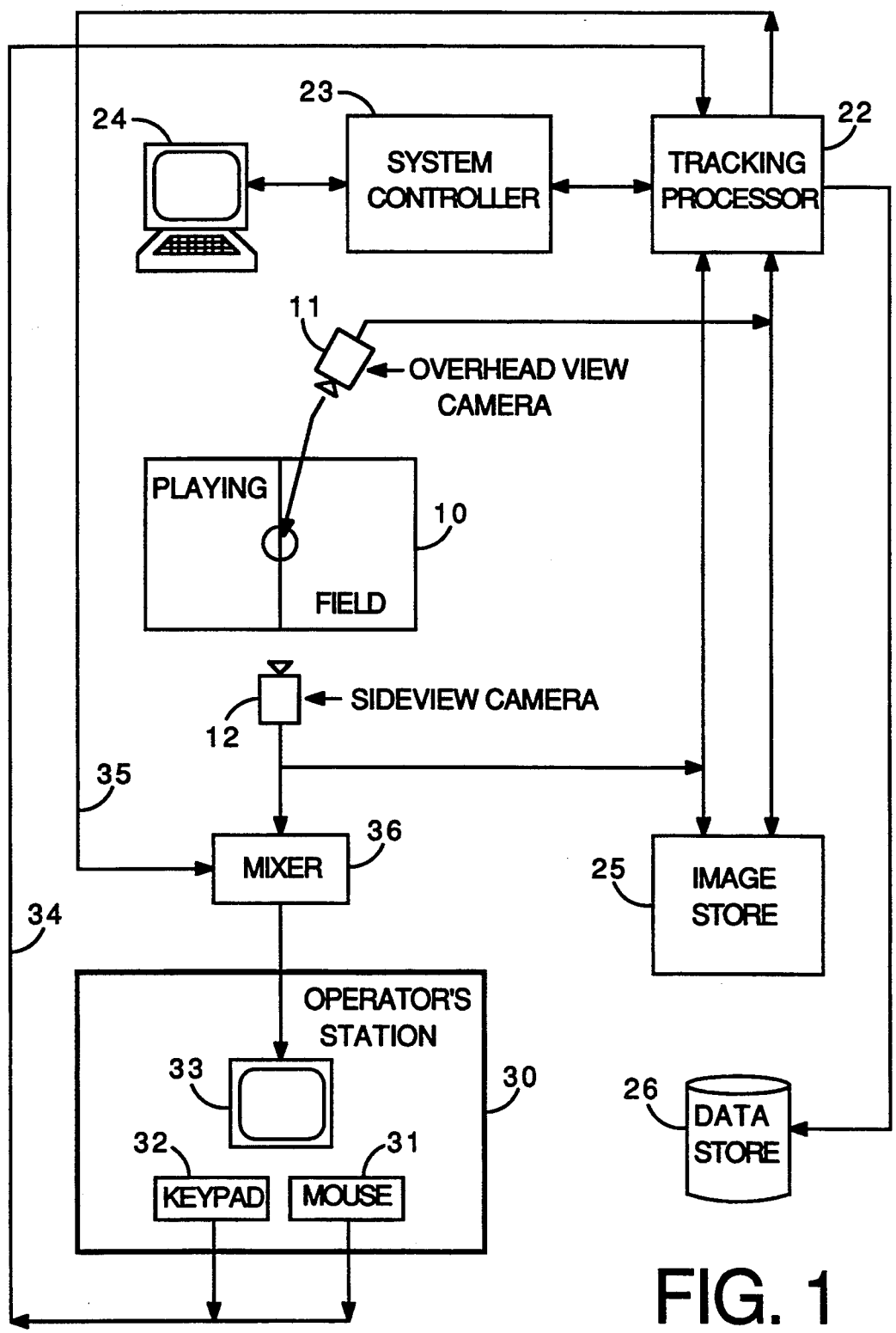
FIG. 1 illustrates a sports playing area amenable to overhead camera angles, and equipped with the tracking apparatus.

The first embodiment of the invention is diagrammed in FIG. 1. A playing area 10, such as might be used in an indoor sport, e.g. basketball, is equipped with two cameras 11 and 12. Camera 11 is situated directly above the playing area, so as to encompass it entirely, and at as great an elevation as practical, so as to minimize perspective distortion. Camera 12 is situated along the periphery of playing area 10, so as to provide a view similar to that to which a spectator or television viewer might be accustomed.

The output of camera 11 is fed into a tracking processor 22, a collection of computing elements, capable of performing realtime image processing, which has the task of tracking the images of individual players in the camera image. The tracking processor can, for example, be implemented as a system of standard modules, such as digital signal processors, serial ports, frame grabbers and video buffers, plugged into the expansion slots of system controller 23, a general purpose digital computer.

It is important to note that the overhead view afforded by camera 11 provides for good separation of the player silhouettes for the great majority of situations (fights and pile-ups being obvious exceptions). Situations are nonetheless certain to arise when the tracking processor will encounter an ambiguity. Even supposing perfect performance on the part of the tracking processor, it is still necessary for the initial identity of the player silhouettes to be determined. Moreover, a similar initialization is likely to be required following timeouts and other lengthy breaks in the action. This brings us to the next component of the invention: In such situations tracking processor 22 must present a query to an operator situated at operator station 30. The operator is required to follow the game action on a television monitor 33, which displays the view provided by camera 12.

A query is signaled to an operator by highlighting the unidentified silhouette with a colored icon on monitor 33 by means of a video mixer 36. This mixer combines the video signal of operator camera 12 with a second video signal 36, sourced, for example, in a bit-mapped video buffer accessible to the tracking processor. The operator responds to the query by first determining the actual identity of the player in question, employing knowledge of the game and players; then pointing an interactive cursor device 31, such as a mouse, near the highlighted icon, and selecting that icon, e.g. by depressing a button; and finally entering the identity (i.e. number/team) of the player, using a keypad 32. Operator accessories 31 and 32 are attached to interface 34 (a serial interface, for example) accessible to the tracking processor. The latter concludes the query by recording the player identity into its on-going data base and turning off the highlighting associated with that player silhouette.

In the situation where an ambiguity has arisen due to simultaneous overlaps in multiple views, the re-established identities of the player images can be propagated backwards in time to the instant of the overlap. To this end, a player image which has become ambiguous is assigned a temporary identity, for tracking purposes, until the situation has been resolved. The technique used here, termed backtracking, is well known in the art.

Since the camera views used by the tracking processor and the operator are different, it is necessary for the tracking processor to translate its queries, originating from analysis done on the overhead camera images, into the geometrical frame of the operator's peripheral camera view. This is a routine task, long available in the art, and amounts to establishing a fixed geometric mapping between points in the field of view of camera 11 and points on the screen of operator monitor 33.

At the beginning of game action the tracking processor must be primed with the identities (codes or numbers) of each player silhouette, as well as those of the referees. This process begins with the tracking processor scanning the image of the playing area provided by camera 11, and locating each instance of what it determines to be the image of a participant (player or referee) and signal a query by causing it to be highlighted on operator monitor 33. The operator, initially presented with many queries, soon settles into a less demanding routine where ambiguities and resultant queries occur relatively infrequently.

The output signals of cameras 11 and 12 can be optionally saved in an image store 25, such as magnetic disk or video casette, along with time-stamps so as to allow the comparison of the tracking results to the stored images. This also provides a fallback for dealing with unexpectedly difficult problems in the tracking, later on, in a non-realtime mode. If preferred, the entire tracking analysis can be done using pre-stored images as source. This mode of operation might be particularly efficient for handling a high volume of game analyses.

The entire configuration is managed by system controller 23, which serves as the host for tracking processor 22. A system console 24, associated with the system controller, serves as master control point for system initialization and calibration, during which necessary software is loaded into the component processors and geometrical mappings between points in the camera views and points in the physical playing area are established. The very standardized markings on playing fields and courts allows calibration to be a routine application of techniques well known in the art.

The ball poses a more difficult tracking problem because of its greater velocities and smaller image scale compared to the players, and the greater likelihood of it being obscured from a given viewpoint. As a result, the ball may necessitate additional operator attention. In situations where continuous tracking of the ball is required it may be necessary to employ a dedicated operator to assist in this task (this possibility is further discussed below).

The referees can be tracked in a manner similar to players, and their positions stored, or ignored, as required.

The complete game record, a structured collection of positional data for each player and the ball at each moment of the game, is stored digitally in a tracking data store 26. In this form it is available for later analysis by subsequent processing stages, that provide the player and game statistics and visualization capabilities.

Figure 2:
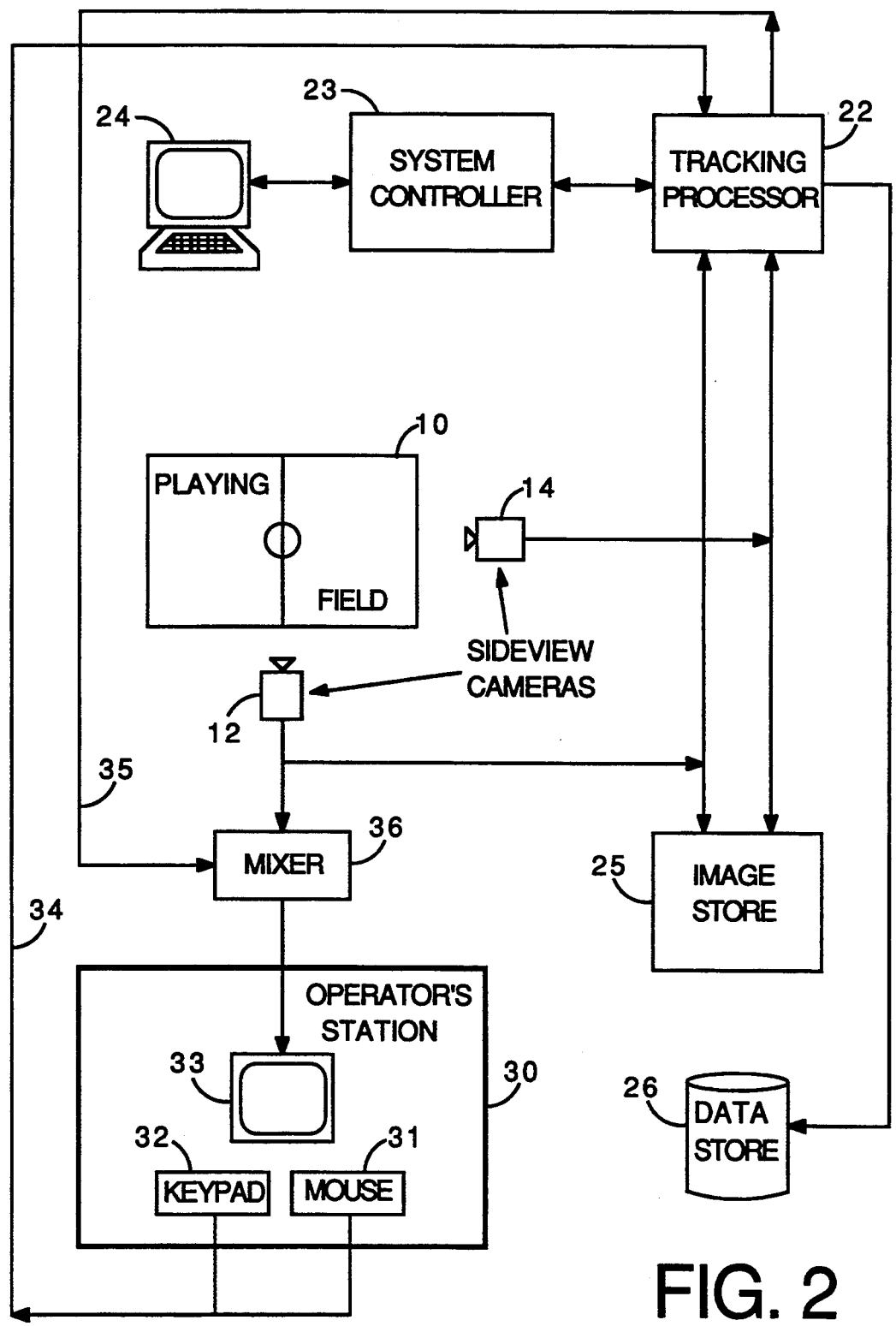
FIG. 2 illustrates a sports playing area restricted to oblique, peripheral camera angles, and equipped with the tracking apparatus.

A second embodiment of the invention is diagrammed in FIG. 2. The situation is essentially identical to that of the first embodiment, but with the additional difficulty that overhead camera angles are not possible or practical. A playing area 10, such as might be used in an outdoor sport, e.g. soccer, is equipped with cameras 12 and 14 situated along the periphery of the area. Each camera is secured at an elevated position and aligned so as to cover the field from an angle roughly orthogonal to that of the other camera. As before, the sequence of images comprising the camera outputs is fed into a digital tracking processor 22, where the same types of image processing techniques, referred to in the first embodiment, are used to track the multiplicity of player images. In this case, however, the low viewing angles of the cameras gives rise to frequent overlaps of player silhouettes. The tracking process used to deal with this situation relies on two empirically-based principles:

1. Relatively simple techniques suffice to track player silhouettes in a video sequence most of the time, since it is an empirical fact that players are generally visually distinct and appear non-overlapping in the views of cameras configured as indicated above.
2. When player silhouettes overlap as viewed from one camera, it is almost always the case that the resulting ambiguity can be resolved from the other camera view, since it is an empirical fact that simultaneous overlaps of the same player silhouettes in both views are quite rare.

These principles allow the tracking process to cope with the less favorable camera angles afforded by outdoor playing areas.

Again, a system for handling ambiguities must be provided, as well as a method for performing initial player silhouette identification and occasional re-identification following breaks in the action. A query/response system essentially identical to that of the first embodiment is used for these purposes. Since the tracking processor and operator are working from the same camera views in this embodiment, it should not be necessary to perform the sort of geometrical mapping described in the first embodiment.

The considerations regarding optional image store 25, system controller 23, the cases of the ball and the referees, the apparatus and technique for storing the tracking results, and the subsequent use of the latter are the same as in the first embodiment.

Figure 3:
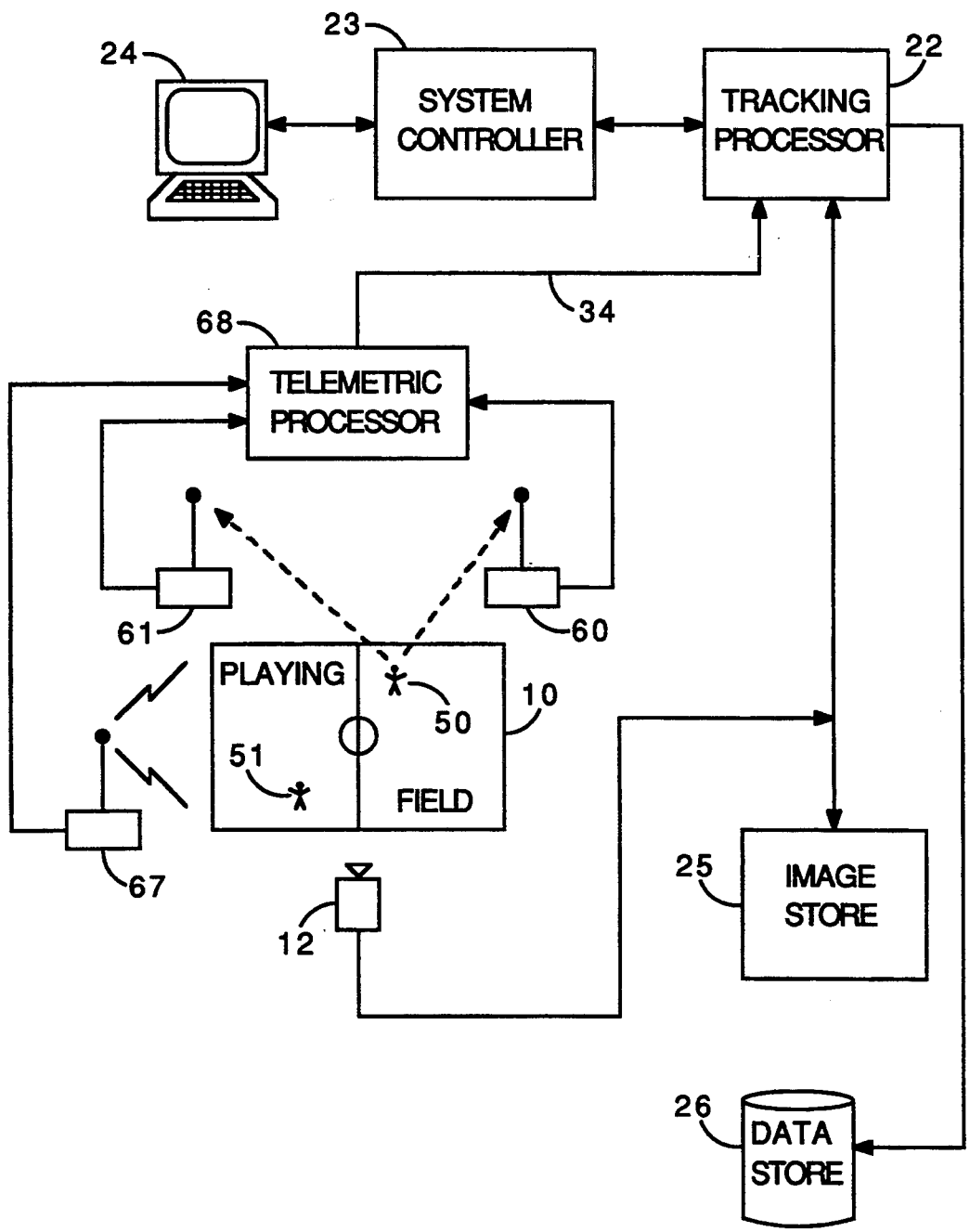
FIG. 3 illustrates a sports playing area equipped with a single, peripheral camera and a digital tracking processor, in addition to telemetric apparatus for estimating the positions of players, using portable electronic transmitters, in conjunction with off-field electronics for tracking the transmitters.
Figure 4:
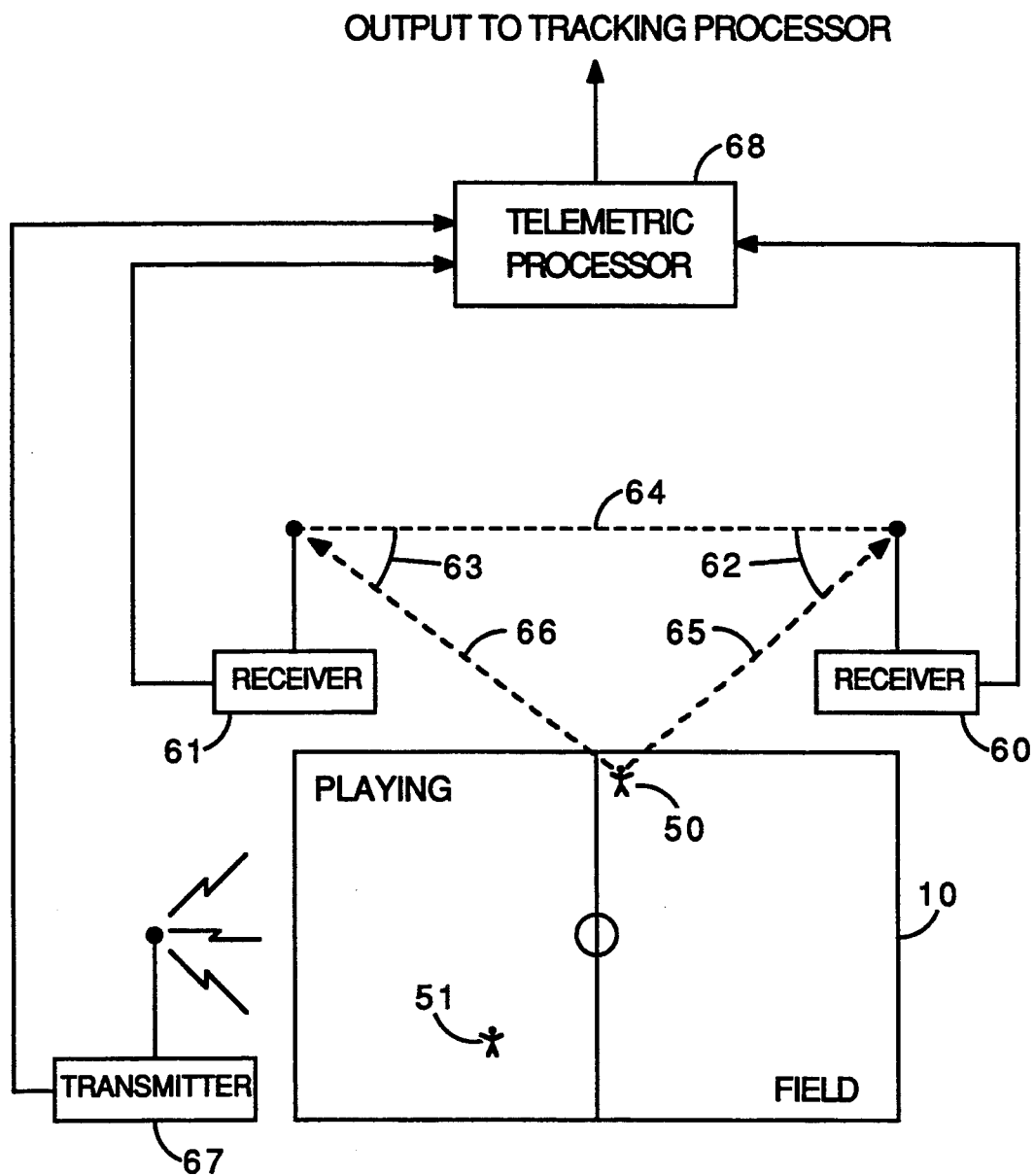
FIG. 4, a detail of FIG. 3, with some additional annotations, further illustrates the workings of the telemetric apparatus.

A third embodiment of the invention is diagrammed in FIG. 3. and the associated detail, FIG. 4. In the first two embodiments, the role of the operators is to provide a way of obtaining, when required, the identity of the individual person associated with a player silhouette. In this third embodiment the operators are eliminated and their function replaced by an independent telemetric system. An electronic device, such as a small portable transmitter/receiver (operating, in the radio or ultrasound domains, for example), is placed on the person of each game participant (two players, 50 and 51, are represented in the figure). The transmitter channels of the portable units are capable of being selectively enabled and disabled, thru the respective receiver channels, tuned to commands transmitted from a stationary transmitter 67. The enabled portable transmitter unit can be then directionally tracked by off-field directional receivers 60 and 61. As represented in FIG. 4., the latter measure the incident angles 62 and 63 of the received signals (illustrated only for player 50). The telemetric processor can then determine the approximate position of the player by solving the resulting triangle, given angles 62 and 63, and fixed baseline distance 64 between receivers 60 and 61. By sequencing thru the portable units repetitively, position information on all the players can be continuously updated and provided to a digital tracking processor 22, thru interface 34 (a serial interface, for example).

At least one camera 11 is situated so as to cover the playing area 10. The perspective afforded by the camera(s) is less critical than in the previous embodiments, and is represented in FIG. 3 as a peripheral view. Nonetheless, an overhead view, if available, is still preferable. As in the other two embodiments, the sequence of images comprising the camera output(s), is fed into the digital tracking processor 22, where the same types of image processing techniques are used to track the multiplicity of player images. The positional accuracy of the telemetric system need not be that great, compared to that of the image-based tracker, a circumstance with favorable implications relative to system cost.

The telemetric data allows frequent re-establishment of the identities of player images, in cooperation with the image-based tracking processor. The motions of players as measured by the telemetric system are easily matched with moving images of players in the camera image(s), using correlation techniques, well known in the art. Consequently, overlaps of player images do not seriously comprise the integrity of the overall tracking task. Rather they simply imply that the players in question are at the same position, within the resolution of the system. When their images move sufficiently far apart, disambiguation can be performed, with the aid of telemetric data. The re-established identities can furthermore be propagated backwards in time to the instant of the overlap, by use of the backtracking technique cited above, thus avoiding gaps in the tracking data. In cases where the game analysis is to be performed after the event, using stored images, the telemetric data can be similarly stored, for use in that analysis.

It may not be possible, solely with the methods and apparatus of this embodiment, to reliably track a ball. In sports such as soccer, however, where the ball is highly visible in the video images, the tracking processor may be able to accomplish this task unassisted.

The considerations regarding optional image store 25, system controller 23, the apparatus and technique for storing the tracking results, and the subsequent use of the latter are the same as in the first embodiment. The following extensions and modifications of the embodiments are noted:

An important extension of the second embodiment, and with some relevance to the first, is the use of additional cameras. This technique further lessens the likelihood of the undesirable multiple view overlap of player silhouettes. With the use of additional cameras, it may no longer be necessary for each camera to cover the entire playing area, so long as every point of it is covered by at least two cameras with roughly orthogonal views. The additional camera views can optionally be made available to the operators, through the use of additional monitors at the operator station.

A very simple but important extension of the first or second embodiment is the use of additional operators, each provided with an operator's station. The tracking processor can distribute the queries among the several operators, so as to lessen the task presented to any one. The ball, being of crucial importance, needless to say, might well merit a dedicated operator, especially in cases where ball-related statistics are critical.

Another modification of the embodiments would be the use of infrared sensitive devices to track the players against the presumably colder floor or field. If not a substitute for the more conventional cameras described above, it might be very useful as an additional source of information for tracking.

What is claimed is:

1. An automated tracking system for obtaining a detailed data base, representing the position in time of the players in a sports contest conducted in a playing area, which comprises:

a first means for obtaining realtime video images of said sports contest from a plurality of views;

a second means for determining the player identity of each of said player images within said plurality of views at the commencement of said sports contest, and subsequently as requested by said system, through the use of a human operator provided with a monitor view of said playing, area equivalent to one of said plurality of views;

a third means for automatically locating and tracking the positions of said player images, within a subset of said plurality of views, using realtime computing elements, provided said player images move in trajectories isolated from one another, within each of the views included in the subset;

a fourth means for communicating the initial player identities provided by said second means to said computing elements, and to allow the maintenance of an on-going game record of the identity and position of each player image being tracked by said computing elements;

a fifth means for allowing said computing elements to resolve, if possible, the identity and position of players, whose player images overlap as seen from one view, by use of information available in a different view, among said subset of views;

a sixth means allowing said computing elements to detect when ambiguity as to the player identity associated with a player image has occurred due, for example, to the simultaneous overlap of player images in several of said subset of views, so as to prevent resolution by said fifth means;

a seventh means allowing said computing elements to signal said operator of the occurance of said ambiguity, and to represent such signaling, within the monitor view provided to the operator by said second means, by locating and highlighting a player image, in the monitor view, corresponding to the ambiguous player image, detected by the said sixth means;

an eighth means allowing said operator to indicate selection of said player image associated with said ambiguity and to communicate the actual identity of the player associated with that player image to said computing elements, after making a judgement on the basis of the monitor view provided by said second means;

a ninth means allowing said computing elements to re-establish the identity of the ambiguous player image of said sixth means, as the player identity communicated by said eighth means, and to, furthermore, propagate it backwards in time to the instant when said ambiguity was detected by said sixth means, so as to avoid gaps in the game record of said fourth means.

2. The automated tracking system of claim 1 wherein said first means comprises video camera images prerecorded in a video storage medium.

3. The automated tracking system of claim 1 wherein said first means includes infrared sensing devices, sensitive to the radiation characteristic of human bodies.

4. The automated tracking system of claim 1 wherein said second means includes a plurality of operators.

5. The automated tracking system of claim 1 wherein the ball is tracked along with the players, and in a similar manner.

6. The automated tracking system of claim 1 wherein non-player participants, such as referees, are tracked along with the players, and in a similar manner.

7. The automated tracking system of claim 1 augmented by a means for analyzing said game record so as to provide a game analysis, therein including the game record, of said sports contest.

8. The automated tracking system of claim 1 augmented by a means for visualizing said game record.

9. An automated tracking system for obtaining a detailed data base, representing the position in time of the players in a sports contest conducted in a playing area, which comprises:

a first means comprising realtime video images of said sports contest from at least one view;

a second means for automatically locating, and tracking the positions of said player images in said view, using realtime computing elements, provided said player images move in trajectories isolated from one another;

a third means for obtaining, and communicating to said computing elements, the identity and approximate position of players by the use of electronic devices, such as radio or ultrasound transmitters, situated on each player, in conjunction with off-field electronics, incorporating telemetry and triangulation;

a fourth means for allowing the maintenance of an on-going game record of the identity, and position, of each player image being tracked by said computing elements;

a fifth means allowing said computing elements to detect when ambiguity as to the identity of a player image has occurred due, for example, to the overlap of player images in said view;

a sixth means allowing said computing elements to resolve the ambiguity detected by said fifth means by comparing the position of the ambiguous player image to the approximate positions provided by said third means, and selecting the identity associated with the best match;

a seventh means allowing said computing elements to re-establish the identity of the ambiguous player image of said fifth means, as the player identity selected by said sixth means, and to, furthermore, propagate it backwards in time to the instant when said ambiguity was detected by said fifth means, so as to avoid gaps in the game record of said fourth means.

10. The automated tracking system of claim 9 wherein said first means comprises video images pre-recorded in a video storage medium.

11. The automated tracking system of claim 9 wherein said first means includes infrared sensing devices, sensitive to the radiation characteristic of human bodies.

12. The automated tracking system of claim 9 wherein non-player participants, such as referees, are tracked along with the players, and in a similar manner.

13. The automated tracking system of claim 9 augmented by a means for analyzing said game record so as to provide a game analysis, therein including the game record, of said sports contest.

14. The automated tracking system of claim 9 augmented by a means for visualizing said game record.

* * * * *